UNITED STATES PATENT OFFICE.

ARAM VARTANIAN, OF HANFORD, CALIFORNIA.

FOOD AND PROCESS FOR MAKING IT.

1,152,132.  Specification of Letters Patent.  Patented Aug. 31, 1915.

No Drawing.  Application filed April 23, 1914.  Serial No. 834,009.

*To all whom it may concern:*

Be it known that I, ARAM VARTANIAN, a citizen of the United States, residing at Hanford, in the county of Kings and State of California, have invented a certain new and useful Food and the Process for Making It, of which the following is a specification.

My invention relates to food and the process of preparing the ingredients to make them palatable and fit for human consumption. The principal ingredients of my improved food are pumpkin seeds, squash seeds, and sunflower seeds, seasoned with salt, and the process of making the same is as follows: Each ingredient is prepared separately but in the same manner. That is the pumpkin seeds are carefully washed in water until thoroughly clean and are then put into a dish and after adding sufficient ordinary salt to produce the desired flavor and well stirred, they are permitted to stand two or three days until the salt has permeated all of the seeds, and the seeds are then fried in their own oil without the addition of any grease or fatty substance until they are well browned, and when the squash seeds and the sunflower seeds have been treated separately in a like manner the three ingredients of pumpkin seeds, squash seeds and sunflower seeds are combined or thoroughly mixed together and become my improved food ready to be eaten. This may be done at once or several days or weeks thereafter as the product when properly prepared as set out above will keep for a considerable time without deteriorating, and makes a palatable healthful food easily digested, good for the stomach, and beneficial to the teeth which it keeps clean, and it at the same time imparts a pleasant odor to the breath.

The blending of the seeds named after being treated by the process described makes a more enjoyable food compound than the seed ingredients taken separately, but they may be eaten separately after being treated and browned as set forth above.

Having thus described my invention what I claim is:

1. The process of treating pumpkin seeds, squash seeds, and sunflower seeds, for a human food compound, by separating the seeds from the pulp, washing the seeds, and salting and cooking each kind separately and then mixing them all thoroughly together.

2. A human food compound made of pumpkin seeds, squash seeds and sunflower seeds mixed with salt and fried in their own fat.

In testimony whereof I hereto affix my signature in the presence of two witnesses.

ARAM VARTANIAN.

Witnesses:
 E. T. CASPER,
 MAGGIE MOORE.